United States Patent
Dykes et al.

(10) Patent No.: US 6,859,876 B2
(45) Date of Patent: Feb. 22, 2005

(54) SYSTEM AND METHOD FOR DETECTING AND USING A REPLACEMENT BOOT BLOCK DURING INITIALIZATION BY AN ORIGINAL BOOT BLOCK

(75) Inventors: Don A. Dykes, Houston, TX (US); Richmond L. Armstrong, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 09/751,187

(22) Filed: Dec. 29, 2000

(65) Prior Publication Data

US 2002/0087855 A1 Jul. 4, 2002

(51) Int. Cl.$^7$ .................................................. G06F 9/24
(52) U.S. Cl. .......................................................... 713/2
(58) Field of Search ........................................ 713/2, 1

(56) References Cited

U.S. PATENT DOCUMENTS

| | | | | |
|---|---|---|---|---|
| 5,381,549 A | * | 1/1995 | Tamura | 713/1 |
| 6,282,647 B1 | * | 8/2001 | Leung et al. | 713/100 |
| 6,330,634 B1 | * | 12/2001 | Fuse et al. | 711/103 |
| 6,425,079 B1 | * | 7/2002 | Mahmoud | 713/2 |
| 6,446,139 B1 | * | 9/2002 | Leung et al. | 710/1 |
| 6,513,113 B1 | * | 1/2003 | Kobayashi | 711/103 |
| 6,622,246 B1 | * | 9/2003 | Biondi | 713/2 |

* cited by examiner

Primary Examiner—Lynne H. Browne
Assistant Examiner—Eric Chang

(57) ABSTRACT

A unique method and system to update or modify the original boot block of a computer system without endangering the integrity of the system. More particularly, the present invention relates to a method and system that allows for a secondary boot block to be substituted for the original boot block. This is accomplished by having the original boot block check for a replacement secondary boot block as early in the startup code as is feasible. If a valid secondary boot block is found, the startup process is passed to the secondary boot block. The original boot block is maintained, however, so the system can always be recovered.

24 Claims, 3 Drawing Sheets

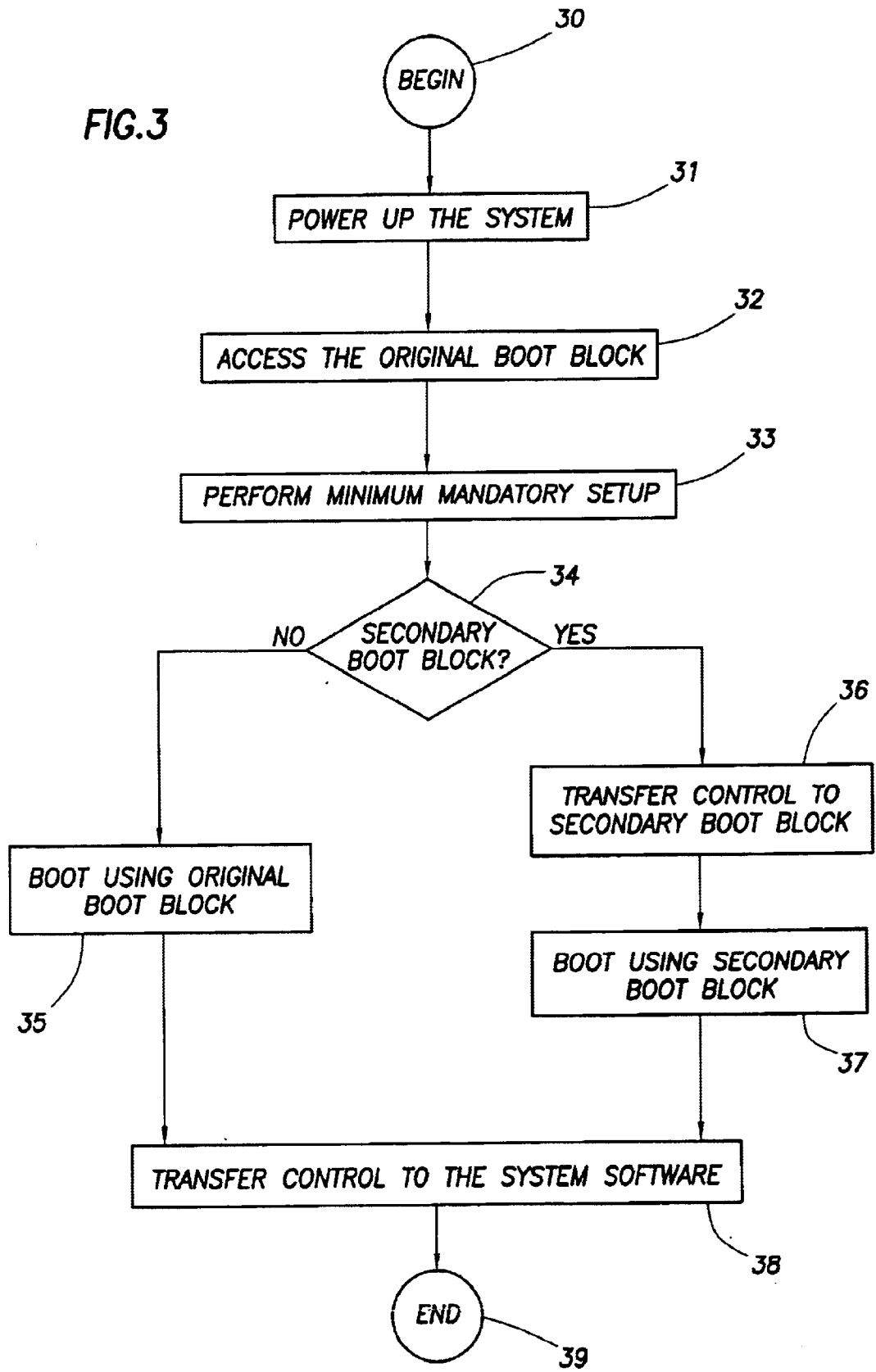

SYSTEM AND METHOD FOR DETECTING AND USING A REPLACEMENT BOOT BLOCK DURING INITIALIZATION BY AN ORIGINAL BOOT BLOCK

STATEMENT REGARDING FEDERALLY SPONSORED RESEARCH OR DEVELOPMENT

Not applicable.

BACKGROUND OF THE INVENTION

1. Field of the Invention

The present invention generally relates to a method and system to update or correct the original boot block of a computer system. More particularly, the invention relates to a method and system to substitute a secondary boot block for the original boot block of a computer system, thereby effectively allowing for modification of the original boot block.

2. Background of the Invention

The procedure for starting up or booting up a computer system is fairly common. When powered on, the computer system executes certain startup code to initialize the system. This startup code is often referred to as a boot block. Essentially, the boot block is intended to create a known state in the computer system from which to begin and to initialize and activate all of the system hardware as necessary. In a personal computer, for example, the boot block includes code to initialize the microprocessor's registers, initialize the DRAM, set-up and recognize other available hardware, etc. This code in a personal computer platform is often referred to as BIOS (Basic Input/Output System). The boot block may need to perform different functions depending on the particular system or platform; however, every system requires some sort of startup code. Therefore every system has some type of a boot block.

Because the boot block initializes the system, it is often stored in protected memory to avoid inadvertent or uninformed modification of its contents. For without the boot block, the computer system cannot be started. In addition, for the boot block to perform its function, it must be stored in memory that is available immediately on startup. Accordingly, the boot block is typically stored in hardware-protected ROM (Read Only Memory) that requires no startup initialization by the computer system. For example, the boot block may be stored in a PROM (Programmable Read Only Memory) that requires no initialization and is protected from modification since a programming device separate from the computer system is typically required to change the memory. In fact, some PROMs are one-shot devices, meaning they can only be programmed once. EPROMs (Erasable Programmable Read Only Memory) may also be used since they require no initialization and, although they are erasable, they typically require UV (ultra violet) radiation to erase them. More recently, however, less costly FlashROMs have been used which have at least a portion of their memory hardware-protected, meaning some hardware interference is required to change that portion of the memory.

Having the boot block stored in unalterable or hardware-protected memory does, however, create some difficulties. In particular, it is by design difficult to update or correct the boot block. While it is desirable to protect the boot block from unintentional or uninformed modification of its contents, i.e., by a user of the computer system, there are times when the boot block may need to be modified. For example, when the system designers want to implement an upgrade to the system which requires a modification to the boot block, perhaps because there was a glitch or bug in the original boot block, or to allow the system to handle conditions not foreseen previously. Whatever the reason, there are times when the boot block needs to be modified. In the past, this meant that most boot block ROMs were mounted to a board in the system via a socket. This allowed the boot block to be changed by physically replacing the ROM with a new ROM containing the updated boot block. Sockets, however, have fallen into disfavor for most computer systems. In particular, sockets add cost to the system, both in terms of the additional materials cost as well as the manufacturing costs. Today, most boot block ROMs are now soldered to the board. Although cheaper to manufacture, this means replacement of the board is required in order to replace the ROM. Obviously, neither solution is desirable.

One solution would be to place the boot block in alterable memory (i.e., memory that can be changed by the system). Although this solution would appear to resolve the replacement problem discussed above, unprotecting the boot block creates a risk of inadvertent or uninformed modification of the boot block. In addition, any attempt to modify or update the original boot block presents a real risk of rendering the system inoperable and unrecoverable since the original boot block has not been maintained.

BRIEF SUMMARY OF THE INVENTION

In accordance with the present invention, there is provided a novel method and system for updating or modifying the original boot block in a computer system without endangering the integrity of the system. In particular, the novel method and system of the present invention allows for a secondary boot block to be substituted for the original boot block. The original boot block is not overwritten, however, so the system can always be recovered. This is accomplished by having the original boot block check for a replacement secondary boot block as early in the startup code as is feasible. If a valid secondary boot block is found, the startup process is passed to the secondary boot block. Thus, updates or modifications can be made by implementing a secondary boot block into the system. The original boot block is maintained, however, so the system can always be started even if the secondary boot block becomes defective.

BRIEF DESCRIPTION OF THE DRAWINGS

The invention can be more fully understood by referencing the accompanying drawings wherein:

FIG. 3 shows a flow chart illustrating the method and process of booting up a computer system as contemplated by the present invention.

NOTATION AND NOMENCLATURE

Figure 1:
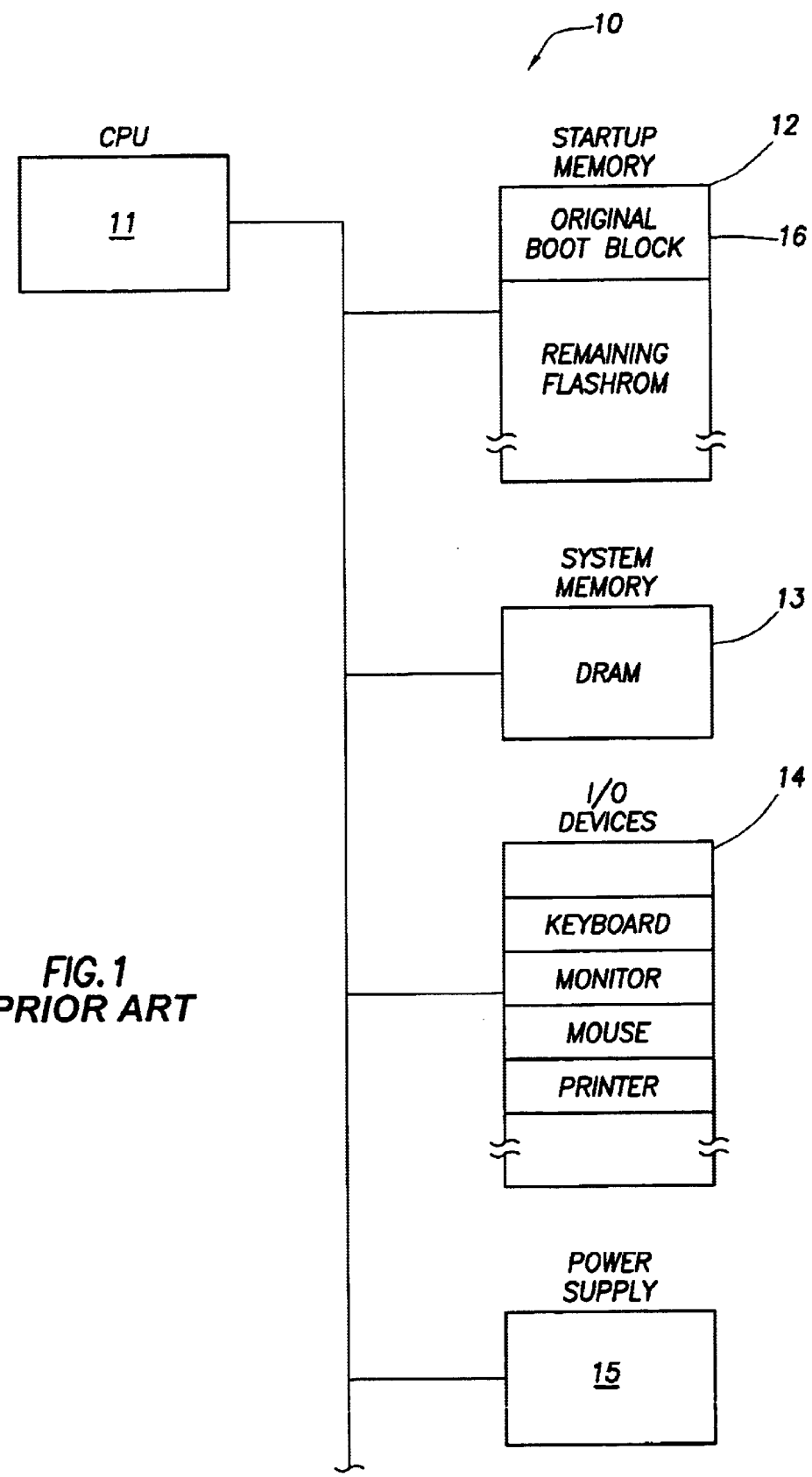
FIG. 1 shows a system diagram of a computer system utilizing a boot block for startup prior to the present invention.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term computer system is used broadly herein to include any microprocessor-based system or platform.

DETAILED DESCRIPTION OF THE DRAWINGS

Referring now to the drawings, wherein like reference characters denote corresponding components or parts:

FIG. 1 shows a system diagram of a computer system 10 utilizing a boot block for startup prior to the present invention. Although the present invention is not limited to a specific computer system or platform and can be used in any system requiring a boot-up process, a typical computer system architecture is shown in FIG. 1 for demonstrative purposes. As shown in FIG. 1, a central processing unit (CPU) 11 is coupled to startup memory 12, system memory 13, and input/output (I/O) devices 14, all of which are in turn coupled to the system power supply 15. The CPU 11 is typically a microprocessor or processor chip set. As shown, the system memory 13 is DRAM (Dynamic Random Access Memory). The I/O devices 14 may include a monitor, keyboard, mouse, printer, etc. The power supply 15 may be of any type effective to convert the line power available to the voltages required by the system 10.

As shown, the startup memory 12 includes the original boot block 16. The original boot block 16 comprises the startup code for the system 10. The boot block 16 initializes the system components and brings the system 10 up to a known state before passing control to the system software stored in the system memory 13. The system memory 13 requires initialization before it can be used so the system software stored therein cannot be accessed until the initialization of the system 10 is complete. To accommodate the function of the boot block 16, the startup memory 12 is typically FlashROM which requires little or no initialization such that it can be available almost immediately after power up of the system 10, and which can be hardware protected, in whole or in part, to prevent inadvertent modification of the boot block 16. Although FlashROM is used in the current embodiment of the invention, any memory having these capabilities can be used to store the boot block 16.

The system 10 is started by turning on the power supply 14 to provide power to the system 10. After power up, the CPU 11 accesses the startup memory 12 and begins execution of the boot block 16. The boot block 16 performs the necessary system setup and initialization, such as initializing the DRAM of the system memory 13, and then passes control to the system software. The boot block 16 brings the system 10 up to a known level before handing control to the system software and user. Without the boot block 16, the system could not be started. It is important, then, to protect the boot block 16 from any inadvertent or uninformed modifications. Accordingly, the boot block 16 is typically stored in startup memory 12 that can be protected, in whole or in part, from such modification. In addition, the boot block 16 must be available shortly after power up of the system. Therefore, the boot block needs to be stored in memory that requires no active initialization. As noted above, although other types of memory can meet these criteria, such as PROMs or EPROMs, present systems generally use FlashROM since it is currently the most cost effective memory available with these characteristics.

A problem arises, however, when the boot block 16 needs to be modified. The boot block 16 may need to be modified in order to accommodate an update or upgrade of the system 10, or to correct bugs or glitches in the boot block 16. In early systems, the startup memory 12 was installed in the system 10 via a socket or sockets depending on the number of chips comprising the startup memory 12. This allowed the boot block 16 to be modified by physically replacing the startup memory 12. In particular, the chips comprising the startup memory 12 were simply replaced with new chips via the sockets. Sockets, however, have fallen into disfavor for most computer systems. In particular, sockets add cost to the system, both in terms of the additional materials cost as well as the manufacturing costs. Instead, most startup memory 12 today is soldered to a printed circuit board. Now, however, a change in the startup memory 12 requires replacement of the entire board. Thus the need for a more convenient way to modify the boot block 16 arises. Although the problem could be avoided by simply unprotecting the boot block 16 so that it can be rewritten or overwritten, such a solution puts the integrity of the system at jeopardy. In particular, if the boot block 16 is inadvertently or incorrectly modified, there may be no way to boot up the system at all. Thus requiring a major effort to reinstate the system to operable conditions.

Instead, the present invention provides a method and system for modifying the boot block without having to replace the startup memory 12, while ensuring system integrity by leaving the original boot block 16 in place for a fail-safe recovery of system operation.

Figure 2:
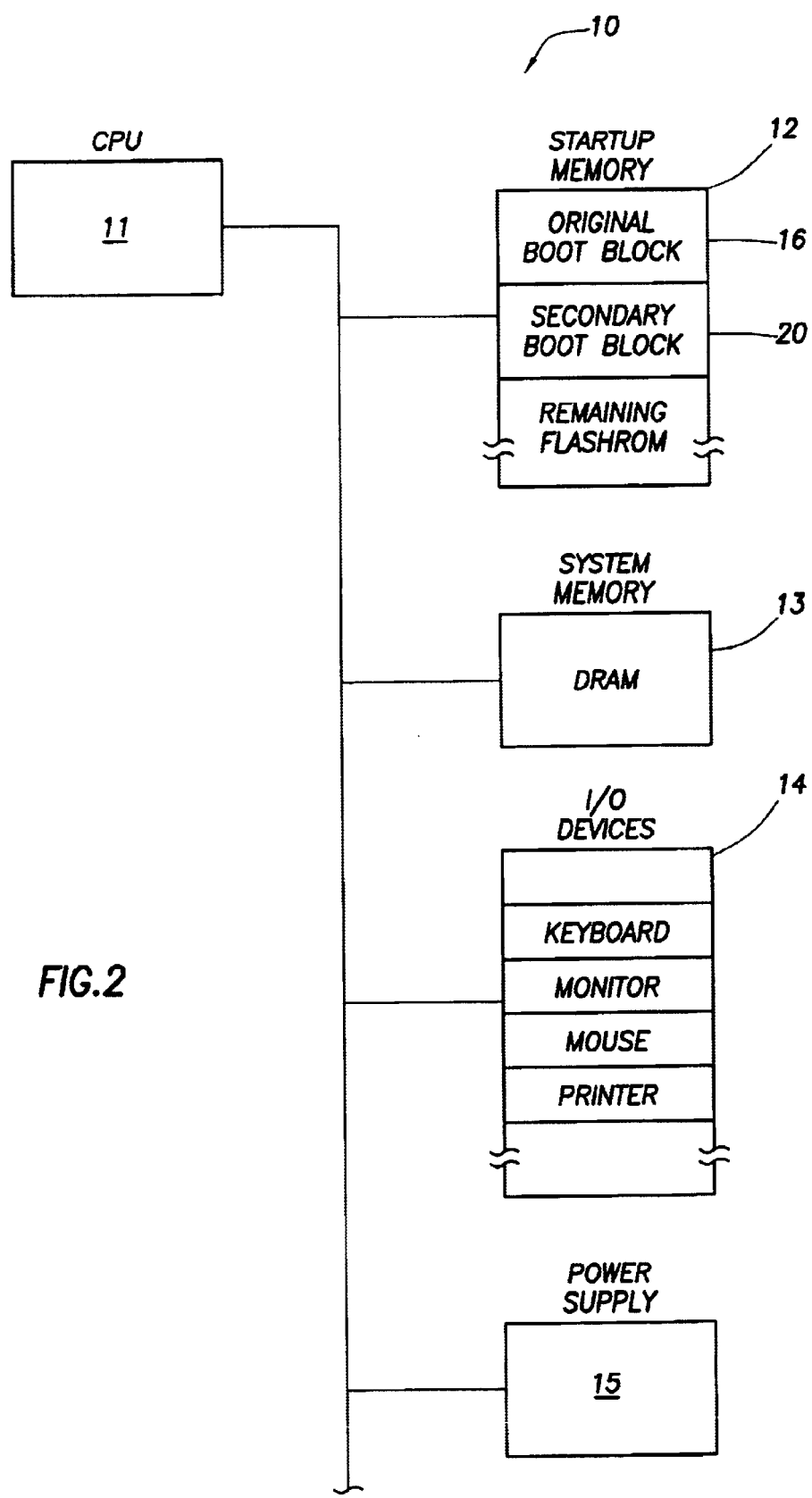
FIG. 2 shows a system diagram of a computer system utilizing a boot block for startup as contemplated by the present invention.

FIG. 2 shows a system diagram of a computer system utilizing a boot block for startup as contemplated by the present invention. In addition to the components as shown in FIG. 1., FIG. 2 also includes a secondary boot block 20 in the startup memory 12. The secondary boot block 20 can be used as an alternative to the original boot block 16. By selectively substituting the secondary boot block 20 for the original boot block 16, the startup code of the system 10 can be modified just as if the original boot block 16 were being modified.

In accordance with the present invention, the startup or boot up process of the system 10 is modified as follows: As in FIG. 1, the system 10 is started by turning on the power supply 14 to provide power to the system 10. After power up, the CPU 11 accesses the startup memory 12 and begins execution of the original boot block 16. Instead of performing the entire initialization of the system 10, however, the original boot block 16 only performs the minimum system setup and initialization absolutely necessary before checking to see if a secondary boot block 20 is present. Typically, this includes setting some registers in the microprocessor, for instance to disable some interrupt functions to ensure the boot up process can be completed without interruption, and launching chip selects in order to see or access the startup memory. Once the minimum mandatory functions are complete, the original boot block 16 checks for the existence of a valid secondary boot block 20. If no secondary boot block 20 is present, the original boot block 16 completes the initialization of the system 10 and passes control to the system software as normal. If a secondary boot block is present, however, the original boot block 16 passes control to the secondary boot block 20 to complete initialization of the system 10 before passing control to the system software. In this manner the startup or initialization process can be modified from the original boot block 16. It should be noted, however, that anything that occurs in the original boot block 16 prior to passing control to the secondary boot block 20 cannot be modified or corrected. Thus, the original boot block 16 should check for the secondary boot block 20 as early as possible, performing only those setup functions that are mandatory before determining whether control should be passed to the secondary boot block 20.

Several methods may be employed to determine the existence and validity of the secondary boot block. In the current embodiment of the invention, however, the original boot block 16 simply checks certain predetermined addresses in the startup memory 12 for data and compares that data with predetermined verification data. If the data matches, the original boot block 16 determines that a secondary boot block 20 has been found. Before passing control to the secondary boot block 20, however, the integrity or validity of the secondary boot block 20 is also checked by performing a checksum on all, or a portion of, the startup memory 12 allocated for the secondary boot block 20. If the checksum is passed, the original boot block 16 passes control to the secondary boot block 20 which resides in the startup memory at the predetermined location. It is contemplated that various methods may be used to verify the existence and integrity of the secondary boot block 20. The key, however, is that so long as one knows what signature the original boot block 16 expects for a secondary boot block 20, the secondary boot block 20 can be constructed with that signature to meet the tests performed by the original boot block 16.

It should also be noted that the theory of a secondary boot block can be extended to multiple, serially-accessed boot blocks. For example, if a secondary boot block needs to be modified or updated, it can typically just be overwritten since it is in alterable memory. In a system where the original boot block contained a significant defect, however, it may be desirable to maintain the secondary boot block for a fail-safe recovery of the system. Accordingly, a third boot block could be implemented so long as the secondary boot block similarly incorporates an initial check for a substitute boot block. In this same manner, any number of substitute boot blocks can be implemented.

FIG. 3 shows a flow chart illustrating the method and process of booting up a computer system as contemplated by the present invention. The process begins, block 30, by powering up the system, block 31. When the system comes up the original boot block is accessed as indicated in block 32. The original boot block performs the minimum setup possible, block 33, before checking for a secondary boot block, block 34. Typically, the microprocessor may require some registers set, some interrupt functions may need to be disabled to ensure the boot up process can be completed without interruption, and chip selects may need to be launched in order to see or access the startup memory. Once the minimum mandatory functions are complete, the original boot block checks for a secondary boot block as shown in block 34. Checking for a valid secondary boot block can be performed in various ways. The secondary boot block can be given a signature by incorporating a unique sequence of data in the secondary boot block at a predetermined location/address. The original boot block can then compare the data in the predetermined specific memory addresses to verification data. If there is a match, then a valid secondary boot block exists. Alternatively, a checksum can be performed on the secondary boot block to confirm its existence and/or to confirm the integrity of the secondary boot block. In general, by programming the original boot block to look for a particular signature to verify a secondary boot block, the secondary boot block can be implemented by simply ensuring that it incorporates the necessary signature.

If no secondary boot block is found, the system boots normally using the original boot block as shown in block 35. Once the original boot block has completed its startup process, control is passed to the system software, block 38, and the booting process ends at block 39.

If a secondary boot block is found, however, the original boot block transfers control to the secondary boot block as indicated in block 36. The system then continues to boot using the secondary boot block as shown in block 37. Once the secondary boot block has completed its startup process, control is again passed to the system software, block 38, and the booting process ends at block 39.

It should be noted that since the original boot block is maintained, and not overwritten with the secondary boot block, the system is fail-safe. That is, even if the secondary boot block becomes defective, the system can still be started using the original boot block.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. A computer system, comprising:
   a microprocessor;
   startup memory coupled to the microprocessor, wherein the startup memory is available on power up of the system; and
   an original boot block stored in the startup memory, wherein the original boot block checks for a secondary boot block; and
   wherein the original and second boot blocks are each adapted to perform at least a portion of an initialization of the computer system and then to pass control to an operating system; and
   wherein the secondary boot block is a replacement boot block for the original boot block.

2. The computer system of claim 1 wherein the original boot block checks for a secondary boot block stored in the startup memory.

3. The computer system of claim 1 wherein the original boot block checks for a secondary boot block at a specific memory address.

4. The computer system of claim 1 wherein the original boot block checks for a secondary boot block by comparing data at specific memory addresses to verification data.

5. The computer system of claim 1 wherein the original boot block checks for a secondary boot block by performing a checksum of specific memory addresses.

6. The computer system of claim 1 wherein the original boot block checks the integrity of a secondary boot block by performing a checksum of specific memory addresses.

7. The computer system of claim 1 wherein the original boot block only performs mandatory initialization functions before checking for a secondary boot block.

8. The computer system of claim 1 wherein the original boot block is protected from modification.

9. The computer system of claim 1 wherein when a secondary boot block is found in a portion of the startup memory that portion of memory is protected from modification.

10. A method, comprising:

powering up a computer system having startup memory;

accessing an original boot block in startup memory to begin to initialize the system;

checking for a secondary boot block; and a secondary boot block is present, completing initializing the computer system using the secondary boot block instead of the original boot block;

wherein the secondary boot block is a replacement for the original boot block.

11. The method of claim 10 comprising checking for a secondary boot block stored in the startup memory.

12. The method of claim 10 comprising checking for a secondary boot block at a specific memory address.

13. The method of claim 10 wherein checking for a secondary boot block comprises comparing data at specific memory addresses to verification data.

14. The method of claim 10 wherein checking for a secondary boot block comprises performing a checksum of specific memory addresses.

15. The method of claim 10 further comprising checking the integrity of a secondary boot block by performing a checksum of specific memory addresses.

16. The method of claim 10 wherein the original boot block performs the checking for a secondary boot block.

17. The method of claim 16 wherein only mandatory initialization functions are performed by the boot block before checking for a secondary boot block.

18. The method of claim 16 wherein the original boot block is protected from modification.

19. The method of claim 10 further comprising protecting a portion of startup memory from inadvertent modification during system operation when a secondary boot block is found in that portion of the memory.

20. A computer system, comprising:

a microprocessor;

a read only memory ("ROM") coupled to the microprocessor; and a first boot block stored in the ROM and, if a second boot block is also stored in the ROM, control passes from the first boot block to the second boot block for completion of system initialization, said second boot block comprising replacement code for the first boot block.

21. The computer system as in claim 20 wherein the ROM stores the second boot block and a third boot block and the microprocessor determines that the second boot block is stored in the ROM and control passes to the second boot block and the microprocessor then determines that the third boot block is stored in the ROM and control passes to the third boot block.

22. The computer system as in claim 20 wherein control passes to an operating system upon completion of execution of either of the first or second boot blocks.

23. The computer system of claim 20 wherein the ROM comprises a type of memory selected from the group consisting of programmable ROM, electrically erasable programmable ROM, and flash ROM.

24. The computer system of claim 20 wherein the first boot block cannot be overwritten and thereby remains usable, and the second boot block can be overwritten.

* * * * *